Jan. 18, 1966 R. SCHÜRCH 3,230,155
PRODUCTION OF PURE METHANOL BY THERMO-COMPRESSION DISTILLATION
Filed Nov. 22, 1961
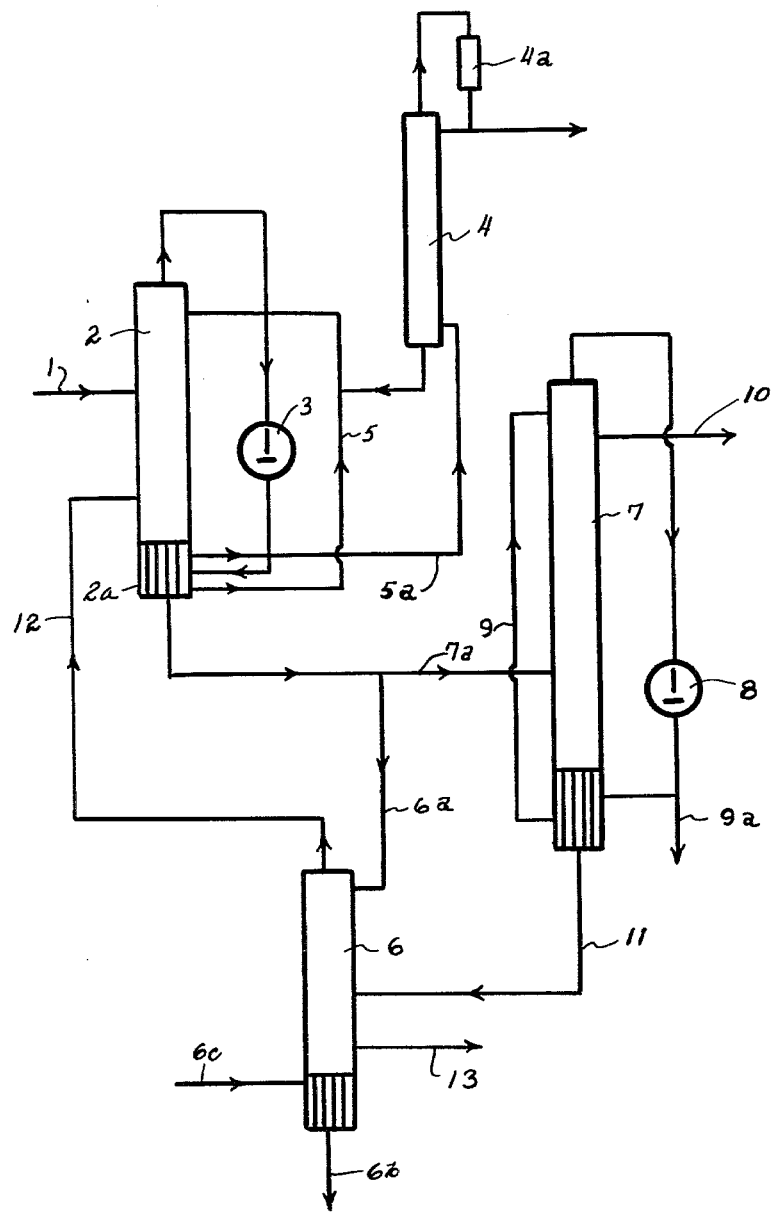
INVENTOR.
RUDOLF SCHÜRCH
BY
MESTERN & MESTERN

United States Patent Office 3,230,155
Patented Jan. 18, 1966

3,230,155
PRODUCTION OF PURE METHANOL BY THERMO-COMPRESSION DISTILLATION
Rudolf Schürch, Chur, Switzerland, assignor to Inventa A.G. für Forschung und Patentverwertung, Zurich, Switzerland
Filed Nov. 22, 1961, Ser. No. 154,167
Claims priority, application Switzerland, Nov. 26, 1960, 13,269/60
1 Claim. (Cl. 203—26)

The invention relates to a process for manufacturing pure methanol from crude synthetic methanol and, more particularly, to the improved distillation of the crude methyl alcohol in an economical manner by the use of heat pumps.

Synthetically produced crude methanol contains a number of by-products, as is well known. Heretofore, these by-products had been separated from the methyl alcohol by distillation in one or several columns. It also is known that this distillation, wherein approximately 1–2.5 kg. steam are used per kilogram methanol, considerably increases the cost of pure methanol.

It now has been found that the distillation cost can be lowered considerably and the efficiency of the distillation increased to a great extent when, in the production of pure methanol, heat pumps are employed. The steam consumption thereby is lowered to approximately 0.3 kg. per kilogram pure methanol.

The object of the invention, hence, is a process for the manufacture of pure methanol by the distillation of crude methanol which had been produced synthetically and embraces the following steps:

The crude methyl alcohol, after being freed from dimethyl ether and gases is, separated in a first distillation column from volatile ingredients, whereby the mixture of methanol and volatiles, which accumulates in the still head in the form of vapors, conducted to and compressed by a heat pump, and is used for heating of the evaporator of this column. A part of the mixture thereby condenses and is recycled into the column.

The portion which has not condensed is conducted into a second column where the mixture is further enriched in volatile components which then are removed from the process. The liquid collecting at the still bottom also is recycled into the first column. The product collecting on the bottom of the first column largely is conducted into a third column where it is freed from non-volatile components, and the vapors are compressed in a heat pump and are fully condensed to heat the evaporator in the bottom of this third column. These compressed vapors then are partly removed from the process, while the remaining part is recycled into this third column. Thereby the boiling point of the product in the bottom of the third column, due to its high methanol content, is held so low that it is lower than the condensation point of the compressed vapors. This product from the bottom of the third column is freed from methanol in a steam-heated fourth column, and the vapors formed thereby, which are rich in methanol content, again are recycled into the first column, while simultaneously using a portion of the bottom product of the first column as reflux in the fourth column.

The process now will be further illustrated with reference to the accompanying drawing which is a flowsheet of the process and then by an example. However, it should be understood that these are given merely by way of explanation, not of limitation, and that numerous changes may be made in the details without departing from the spirit and the scope of the invention.

The flowsheet shows the process in the following manner:

The crude methanol, after being freed from dimethyl ether, is introduced, by way of pipe 1, into the first column 2. In this column, the crude methanol is freed from volatile components at a large reflux proportion. Heating of column 2 is carried out in part by direct introduction of vapors from the distillation column 6, described below, and in part by the vapors from the head of column 2 which had been compressed in the heat pump 3 and which are condensed, to their largest part, in evaporator 2a and recycled to column 2 by way of pipe 5 to serve as reflux. A small portion of the vapors is conducted, in the form of vapors, into the concentrating column 4 by way of pipe 5a. From the head of the concentrating column 4, a first run of a very narrow cut, i.e., of limited boiling range, is separated by way of condenser 4a. The product on the bottom of column 4 is recycled into column 2 as reflux by way of pipe 5. A small proportion of the product in the bottom of column 2, freed from low-boiling, i.e., volatile components, is cycled to column 6 as reflux, by way of pipe 6a. The principal portion is conducted, by way of pipe 7a, into the pure methanol column 7 for the purpose of removal of non-volatile ingredients. Column 7 is heated exclusively by the condensation of the vapors from the head of this column, which are compressed in the heat pump 8. This head product almost exclusively is recycled into column 7 by way of pipe 9, with the exception of a short pre-run which is taken out of the process by way of pipe 9a in order to avoid an enrichment in volatiles.

The pure methanol, i.e., the end product, is drawn off from one of the uppermost plates of column 7 by way of pipe 10. The tails, or last run, in the bottom or sump of column 7, which contain methanol, are recycled, by way of pipe 11, into column 6.

The concentrations at the head of column 6 are the same as in the bottom of the above-described column 2. The reflux for column 6 is conducted from the bottom of column 2 by way of pipe 6a, and the vapors from column 6 are cycled into column 2 by way of pipe 12. From the bottom of column 6, water is drawn off through pipe 6b, and from above the bottom of that column, the higher alcohols, mixed with water and methanol are removed. Fresh steam is entered into the sump of column 6 through pipe 6c.

Example

Crude synthetic methanol which previously had largely been freed from dimethyl ether (remaining ether content approximately 0.05 percent by weight) consisted of the following:

|  | kg. |
|---|---|
| Methanol | 5,121 |
| Water | 192 |
| Higher alcohols | 55 |
| Crude | 5,368 |

Of this mixture, a quantity of 5,466 kilogram per hour (kg./h.), together with 25 kg./h. 3% NaOH in aqueous solution, were introduced, by way of pipe 1, into the first column 2. Therein, in a hourly reflux of 4,600 kg., the crude methanol was freed from its volatile components. Heating of column 2 was carried out in part by direct introduction of the vapors from column 6, by a way of pipe 12, in amounts of 1,000 kg./h., and in part indirectly by the vapors compressed in heat pump 3, which were conducted from the head of column 2 in an amount of 4,600 kg./h. by way of heat pump 3 to the evaporator 2a, thereby were almost completely condensed and recycled as reflux in column 2 by way of pipe 5. A smaller, non-condensed, portion (1,000 kg./h.) of the vapors from column 2 were conducted into the concentrating column 4 by way of pipe 5a. In this concentrating column 4, a narrow cut of a pre-run was removed by way of condenser 4a; the bottom product, in an amount of approximately 1,000 kg./h., was cycled into the first column 2 as reflux, also by way of pipe 5.

A smaller portion (1,000 kg./h.) of the bottom product of column 2 cycled, by way of column 6a, into column 6 as reflux. The principal quantity (6,010 kg./h.) was mixed with 128 kg./h. 1% aqueous potassium permanganate solution, entered, by way of pipe 7a, in the pure methanol column 7, and therein freed from nonvolatile components. Heating of this column was accomplished by condensation of the vapors from its head (9,200 kg./h.), which had been compressed in heat pump 8. This head product, i.e., the condensed vapors, was recycled practically in its entirety to the same column as reflux, by way of pipe 9. A small portion was withdrawn through pipe 9a to prevent enrichment of volatile components. From one of the uppermost plates of column 7 the pure methanol was withdrawn through pipe 10 in amounts of 5,120 kg./h. A methanol-containing post-run (55 percent by weight methanol, 40 percent water and 5 percent higher alcohols) in an amount of 1,013 kg./h. was recycled, by way of pipe 11, into column 6.

The concentration proportions in the still head of column 6 were the same as in the bottom of column 2. The reflux for column 6, in an amount of 453 kg./h. was conducted from the bottom of column 2 through pipe 6a, and the vapors from column 6, in quantities of 1,000 kg./h. were cycled through pipe 12 into the first column 2. From the bottom of column 6, 311.5 kg./h. of bottom product were withdrawn. Above the still bottom, 114 kg. of a mixture of 15 percent by weight methanol 40 percent water and 45 percent higher alcohols, in amounts of 114 kg./h., were drawn off.

I claim as my invention:

A process for the production of pure methanol from crude methyl alcohol which previously had been freed from dimethylether and gases, which comprises subjecting the crude to a first distillation thereby distilling volatile components, compressing the vapors formed of methanol and other volatiles and using them as a heat source in said distillation, whereby a part of said vapors condenses and is recycled into the distillation as reflux; subjecting the uncondensed portion of the vapors to a second distillation thereby further enriching the volatile content and removing the same from the process as overhead; the liquid bottoms from said second distillation collecting thereby being recycled as reflux into said first distillation; the liquid bottoms from said first distillation being subjected to a third distillation to separate relatively non-volatile components from the vapors; the vapors forming during said third distillation being compressed and substantially completely condensed and used as heat source for said third distillation; part of the condensed vapors of said third distillation being removed from the process as pure methanol, the remainder being recycled to said third distillation as reflux, simultaneously maintaining the concentration of the bottoms high in methanol so as to obtain a boiling point of said bottoms which is lower than the condensation point of the compressed vapors; subjecting said liquid from the third distillation to a fourth, externally heated, distillation and removing overhead methanol vapors therein; and recycling them into said first distillation; and simultaneously conducting a portion of the liquid bottoms from said first distillation into said fourth distillation as reflux.

References Cited by the Examiner

UNITED STATES PATENTS

| | | | |
|---|---|---|---|
| 1,805,559 | 5/1931 | Barbet | 260—643 X |
| 1,822,455 | 9/1931 | Ricard et al. | 202—75 |
| 2,509,136 | 5/1950 | Cornell | 202—75 |
| 2,589,018 | 3/1952 | Morrell et al. | 202—40 |
| 2,912,365 | 11/1959 | Irvine | 202—75 |
| 2,936,321 | 5/1960 | Mercier | 260—643 X |
| 3,032,481 | 5/1962 | Harding et al. | |

FOREIGN PATENTS

| | | |
|---|---|---|
| 1,114,168 | 9/1961 | Germany. |
| 308,736 | 5/1930 | Great Britain. |
| 797,045 | 6/1958 | Great Britain. |

NORMAN YUDKOFF, *Primary Examiner.*

GEORGE D. MITCHELL, *Examiner.*